US005729881A

United States Patent [19]

Kent

[11] Patent Number: 5,729,881

[45] Date of Patent: Mar. 24, 1998

[54] HYDRAULIC DISASSEMBLY TOOL

[76] Inventor: Fred Mitchell Kent, 10990 SE. Gomez Ave., Hobe Sound, Fla. 33455

[21] Appl. No.: 715,215

[22] Filed: Sep. 17, 1996

[51] Int. Cl.[6] .................... B23P 19/04

[52] U.S. Cl. .................... 29/252; 29/271; 29/263; 29/244; 29/281.5

[58] Field of Search .................... 29/252, 244, 270, 29/271, 272, 281.5, 282, 263, 260, 269, 259

[56] References Cited

U.S. PATENT DOCUMENTS

| | | | |
|---|---|---|---|
| 1,868,060 | 7/1932 | Grebenstein | 29/252 |
| 2,252,036 | 8/1941 | Rummer | 29/252 |
| 2,303,851 | 12/1942 | Lindroth | 29/244 |
| 2,504,393 | 4/1950 | Cook | 29/252 |
| 3,927,462 | 12/1975 | Freeman et al. | 29/244 |
| 4,279,068 | 7/1981 | Altmayer | 29/252 |
| 5,165,158 | 11/1992 | Markisello | 29/270 |

*Primary Examiner*—Timothy V. Eley
*Assistant Examiner*—Lee Wilson
*Attorney, Agent, or Firm*—Norman Friedland

[57] ABSTRACT

A hydraulic tool for disassembling blowers on certain diesel engines such as those known as Detroit Diesel Engines includes a pair of hydraulically operated pistons that are pressurized by a manually operated hydraulic pump which translates the pistons at the same time to force the shafts of the gears in the blower to slide off of their respective shafts at the same time and onto the respective pistons. This captures the gears and prevents damage to the blower and its component parts. The hydraulic tool includes a platen that is bolted to the casing of the blower by utilizing the tapped holes that are used to bolt the end cover plate of the blower.

13 Claims, 4 Drawing Sheets

HYDRAULIC DISASSEMBLY TOOL

TECHNICAL FIELD

This invention relates to hydraulic tools and particularly to an hydraulic tool that is manually operated in order to disassemble the blower of a diesel engine.

BACKGROUND ART

As is well known in the automotive industry certain diesel engines require a blower for augmenting the flow to and scavenging of the engine and the blower is often required to be repaired or maintained. In particular and what this invention pertains to are the blowers used on the commercially available Detroit Diesel Engines such as the model V-71 that include a blower that requires disassembly for repair and maintenance. These blowers include a pair of parallel shafts and gears mounted on the ends of these shafts which are encased in a housing. To disassemble the unit it is common practice to utilize a pair of special tools that essentially operate as gear removers. The tools are mounted on each of the gears and the gears are removed in an operation that requires the alternate and sequential turning of each tool until the gears are eventually removed from the shafts. The technique for disassembling the Detroit Diesel Engines is illustrated in its Service Manual (6SE184—revised 6/86) available from the Detroit Diesel Allison at 13400 Outer Drive, West Detroit, Mich. 48239-4001. The removal operation is described on Sec. 3.4,page 7 as follows:

"With the blower rear end plate cover, blower drive coupling and governor assembly removed from the blower, . . . disassemble the blower as follows:

Remove the timing gears with pullers J 6270–1. Both gears must be pulled at the same time as follows:

a. Back out the center screws of both pullers and place the flanges against the gear faces, aligning the flange holes with the tapped holes in the gears. Secure the pullers to the gears with 5⁄16"–24×1–½" bolts (two bolts on the L.H. helix gear and three bolts on the R.H. helix gear).

b. Turn the two puller screws uniformly clockwise and withdraw the gears from the rotor shafts".

Obviously, while the manual quoted in the immediate above paragraph requires that the two puller screws must be rotated uniformly, what is required and what is done in actual practice is that each tool is turned alternately in the hopes that the gears will be moved uniformly. Needless to say failure, to follow this procedure will most likely result in damage to the blower. Hence, should one gear be moved a greater distance than the other, the possibility of damage or breakage becomes prevalent.

Moreover, the procedure just described is a rather cumbersome task and it is well known that the mechanics who are involved in this procedure are more apt to use a hammer and iron rod to bang out the gears. In either scenario, if the gears are not removed synchronously, there is a high propensity for the housing to crack or break or the components of the blower to be damaged.

This invention obviates the problem alluded to in the above paragraphs by providing a hydraulic tool that mounts on the casing of the blower by attaching it to the portion of the casing where the removed end plate cover attaches. The hydraulic tool includes a pump handle that operates a pump that pressurizes the hydraulic fluid that serves to drive a pair of pistons bearing on the end of the shafts of each of the gears causing the gears to separate from their respective shafts and slide onto the pistons to be retained by the hydraulic tool. The mechanical advantage and hydraulic advantage of this hydraulic tool is selected to facilitate the travel of these pistons so that they travel at the same time and uniformly whereby the gears are removed at the same time. This tool not only simplifies the procedure for disassembling the blower, but also avoids the possibility of causing injury to the components and casing of the blower while at the same time captures the removed gears so that the possibility of the gears falling and becoming damaged is eliminated.

SUMMARY OF THE INVENTION

An object of this invention is to provide an improved disassembly tool for a blower for a diesel engine that requires the removal of at least two gears simultaneously.

Another object of this invention is to provide an improved disassembly tool that is implemented hydraulically for removing the gears from the Detroit Diesel Engines blowers.

A feature of this invention is the use of a hydraulic pump that drives a pair of pistons uniformly to exert sufficient pressure to the shafts supporting a pair of gears intended to be removed at the same time and capturing the gears once removed.

A feature of this invention is to provide a hydraulic tool for disassembling a blower for a Detroit Diesel Engine which tool is characterized as being simple and inexpensive to manufacture and eases, facilitates and simplifies the disassembly operation.

The foregoing and other features of the present invention will become more apparent from the following description and accompanying drawings.

DETAILED DESCRIPTION OF THE PREFERRED EMBODIMENT

While this invention is being described in its preferred embodiment as a hydraulic tool for disassembling the blower of the Detroit Diesel Engines of the V-71 class, as will be understood by those skilled in this art, this disassembly tool may be utilized for other types of blowers that require the removal of at least two gears to be removed at the same time.

Figure 1:
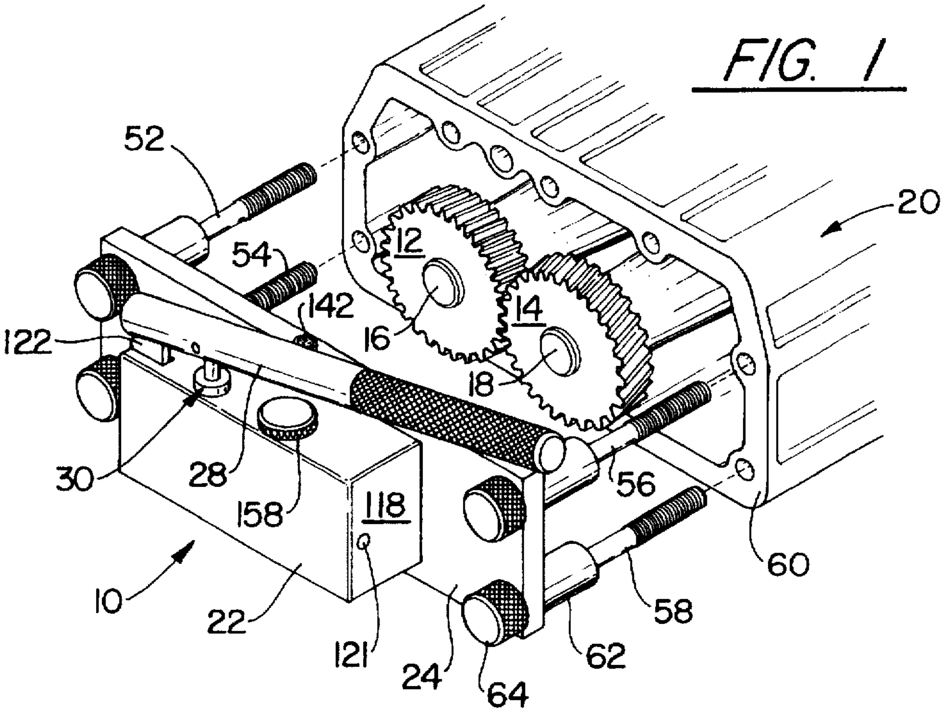
FIG. 1 is perspective and exploded view illustrating the hydraulic tool of this invention being mounted to the housing of the blower once the cover plate of the blower is removed.
Figure 4:
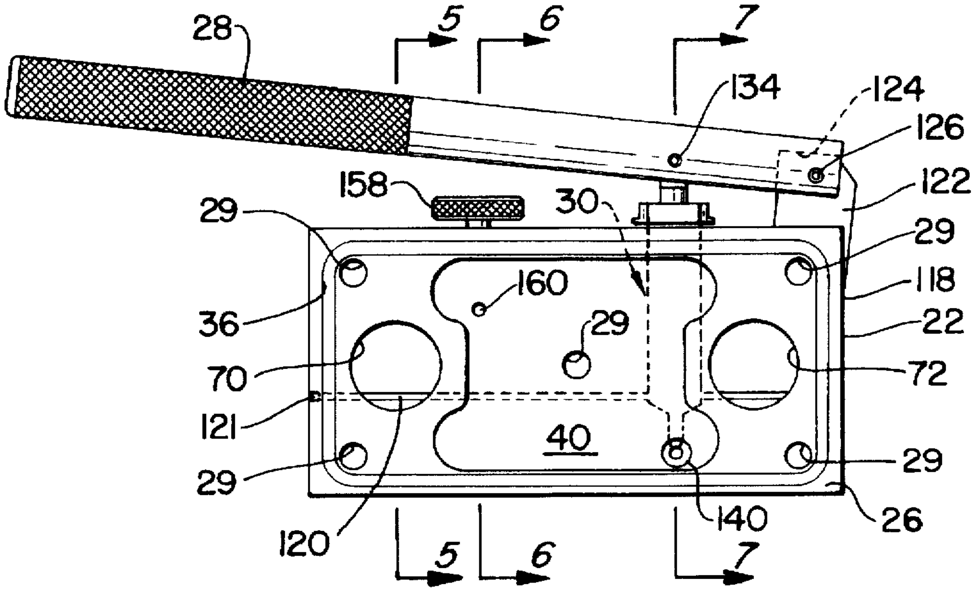
FIG. 4 is a bottom view of the hydraulic tool with the bottom plate removed showing the details of the hydraulic components of the assembly.
Figure 5:
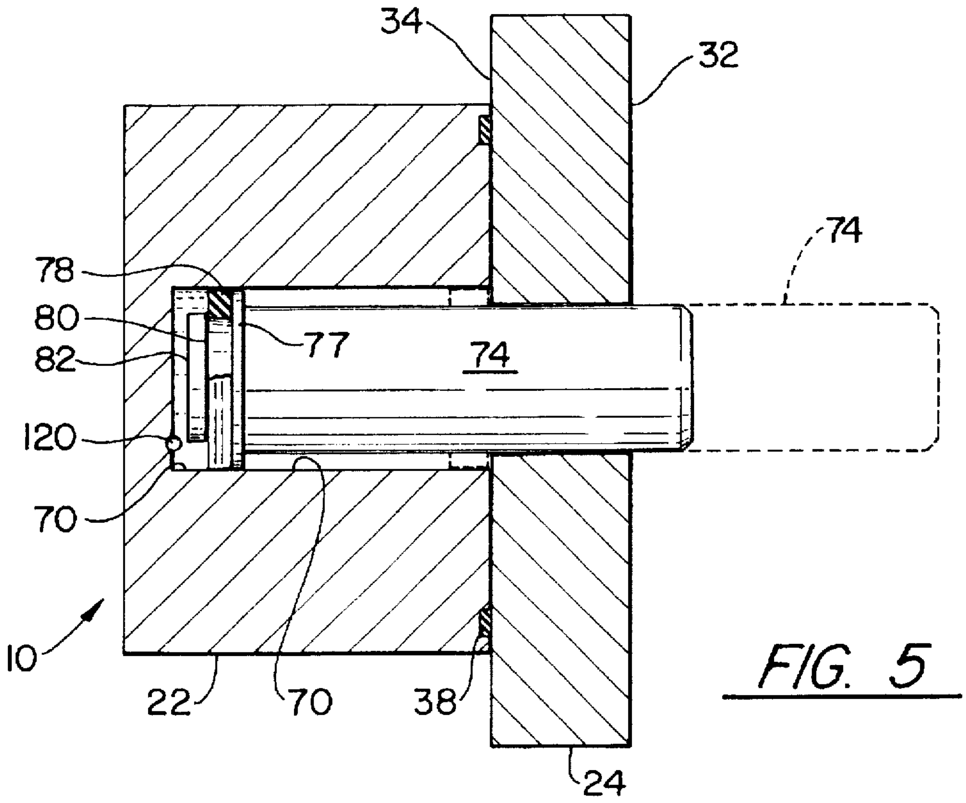
FIG. 5 is a sectional view taken along the lines 5—5 of FIG. 4.
Figure 6:
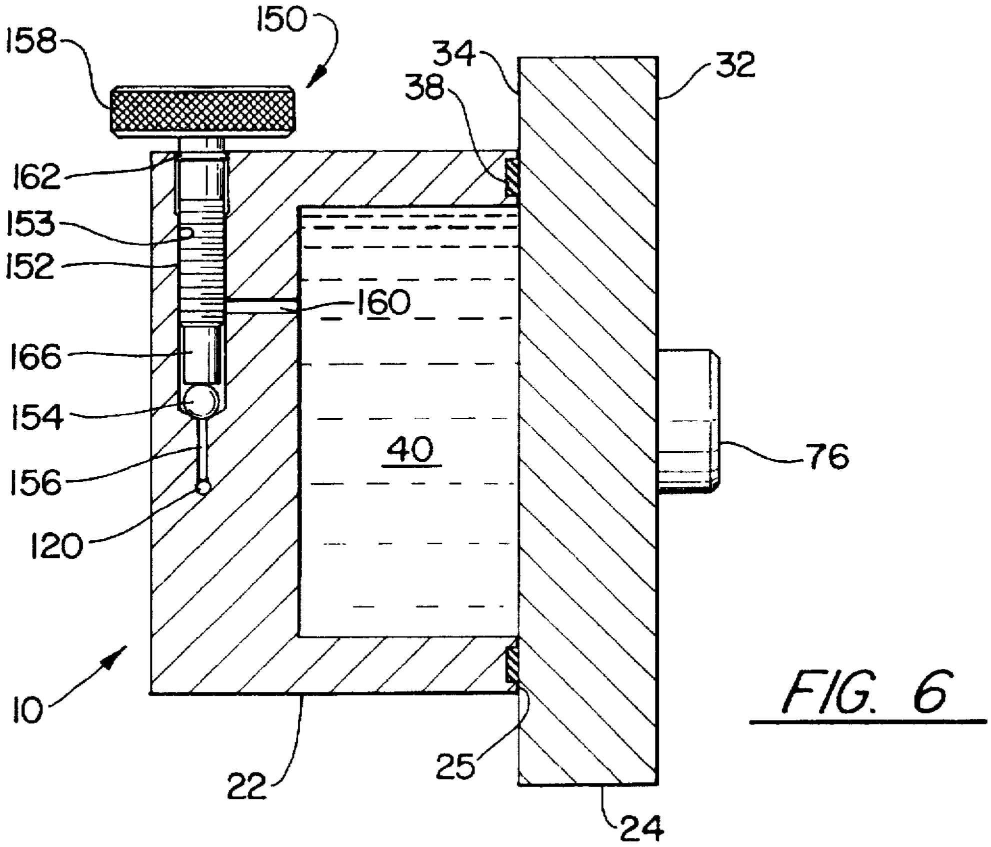
FIG. 6 is a sectional view taken along the lines 6—6 of FIG. 4.
Figure 7:
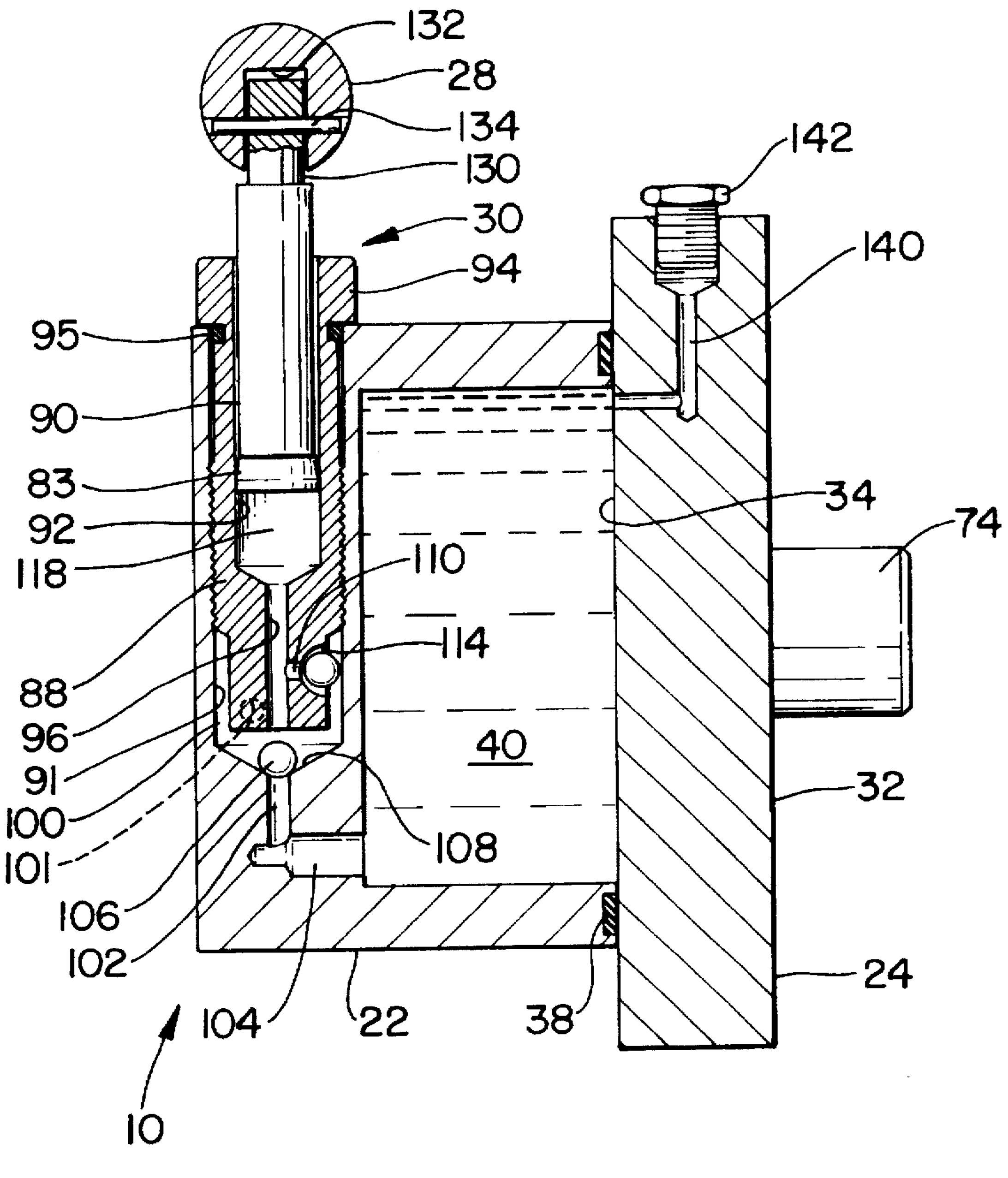
FIG. 7 is a sectional view taken along the lines 7—7 of FIG. 4.

This invention can best be understood by referring to all the FIGS. which show in FIG. 1 the hydraulic tool of this invention generally indicated by reference numeral 10 in ready position to remove the gears 12 and 14 mounted on shafts 16 and 18 respectively of the blower 20. The hydraulic tool 10 essentially consists of the main housing 22 encapsulating the hydraulics and the base plate or platen 24 that fits over the bottom face 26 of the main housing 22 and encloses the end thereof, the pump handle 28 and the hydraulic pump generally indicated by reference numeral 30. The platen 24 which serves to cover the flush open end face 25 of the enclosed main housing 22, is essentially a rectangular body that extends beyond the ends and sides of the main housing 22. The bottom face 32 and top face 34 are planar where the top face 32 forms a flat surface to accommodate the peripheral groove 36 for retaining the seal member 38 that bears against and complements the bottom open end face 26 of the main housing 22 for sealing and enclosing the reservoir 40 formed in the main housing 22 (FIGS. 4, 6 and 7). The seal member 38 may be made from any suitable and commercially available composite or elastomeric material. The platen 24 is secured to the open end face of the main housing 22 by a plurality of flat headed machine bolts 27 that lie flush with the flat surface 32 when assembled that are threaded in the tapped holes 29 formed in the main housing 22.

Figure 2:
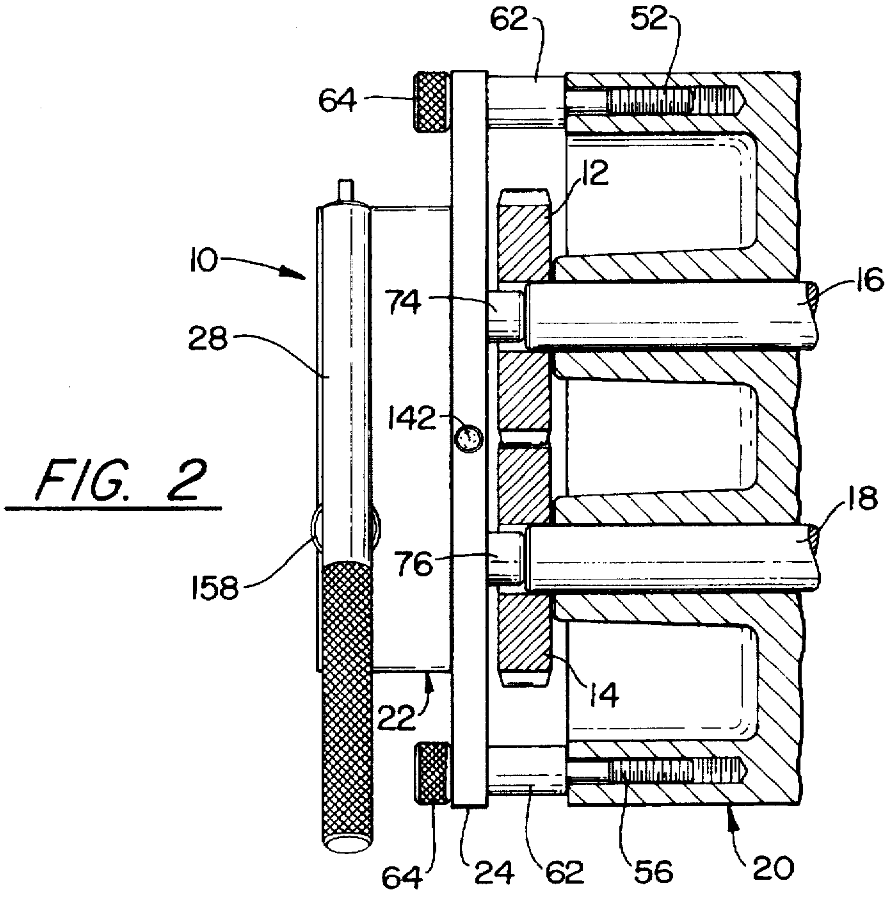
FIG. 2 is a cross sectional view taken through a vertical plane of the hydraulic tool and blower with the tool being attached for the disassembling operation.
Figure 3:
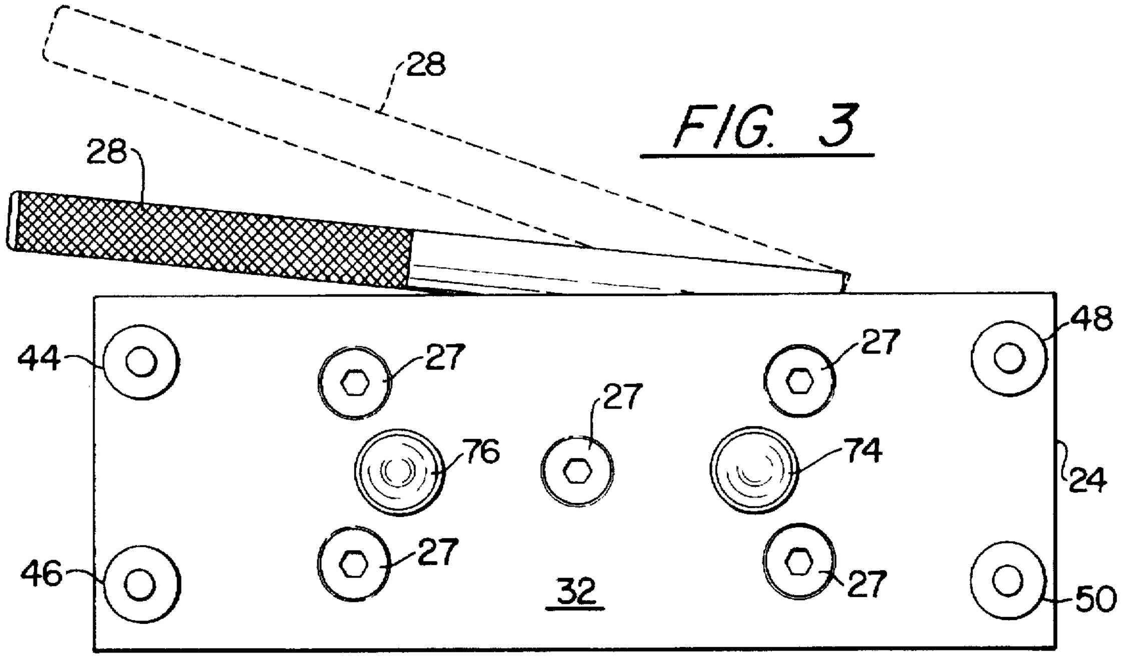
FIG. 3 is a plan bottom view of the hydraulic tool.

The bottom face 32 of the platen 24 which is a flat surface that is mounted parallel to the gears to be removed. As seen in FIGS. 1 and 2, the platen 24 carries four end holes formed on the four corners of platen 24 for accommodating the four machine bolts 52, 54, 56 and 58 that extend therethrough and the location of which complement the tapped holes already formed in the flange 60 of the blower 20. Each machine bolt includes a sleeve 62, all being the same dimensions, that are mounted on the bolts 52, 54, 56 and 58 that serve as spacer to locate the pistons of the hydraulic motor relative to the shafts 16 and. 18 of the blower 20, which will be described in further detail hereinbelow. The ends of the machine bolts may carry a knurled head 64 for ease of assembly of the hydraulic tool to the blower casing. FIG. 2 demonstrates the hydraulic tool 10 mounted to the blower 20 while in operation for pushing the shafts 16 and 18 out of the gears 12 and 14, respectively and capturing the same.

The next portion of this description will detail the hydraulic system of the hydraulic tool and reference will now be made more particularly to FIGS. 4–7. The main housing 22 which is essentially a rectangularly shaped block of aluminum or an alloy thereof that is hollowed in the center as by a reamer, milling operation or the like to form the reservoir 40, and bored by a drill or reamer to form the two cylindrical parallelly disposed bores 70 and 72 that extend partially into the main housing 22 for receiving the pistons 74 and 76, respectively. Pistons 74 and 76 include a larger diameter portion 77 for accommodating sealing member 78 seated in the annular retaining groove 80 formed in each of the two pistons and serve to seal the hydraulic fluid acting on the end working face 82 (only one being seen) and the exposed portion of seal 78 of each piston. A pair of complementary cylindrical holes extending through the platen 24 and dimensioned to accommodate the diameter of the pistons 74 and 76, respectively are formed to allow the pistons to operate on the respective shafts 16 and 18 in the blower 20. Obviously the pressure of the hydraulic fluid acting on this working face causes each of the pistons to translate outwardly to extend beyond the face 32 of platen 24. It will be appreciated that the diameter of the pistons 74 and 76 on the mating end is smaller than the diameter of the respective shafts 16 and 18 so that when the gears are completely disassembled the gears are retained on the shafts 74 and 76.

The hydraulic pump 30 consists of the metallic sleeve 88 threaded into the bore 91 formed in aluminum housing 22 and the piston 90 supported for rectilinear movement in the bore 92 formed in sleeve 88. The sleeve 88 and piston 90 preferably are made from a hard material (harder than the aluminum) such as steel or an alloy thereof. Sleeve 88 carries on its top an enlarged diameter portion 94 configured into a hex shape for receiving a suitable tool for threading the sleeve into the housing 22. An annular groove formed on the top portion of sleeve 88 accommodates a suitable seal 95 such as an O-ring for preventing fluid from leaking out of the bore 91. Bore 92 formed in sleeve 88 extends from the top partially into the sleeve 88 and communicates with axial passage 96 extending to the bottom of the sleeve 88.

As noted in FIG. 7 the diameter of the lower end of sleeve 88 is reduced and spaced from the end of bore 91. The reduced portion 98 forms an annular passage and together with the space formed between the bottom of sleeve 88 and the end of the bore 92 define a cavity 100 for communicating the reservoir 34 with the hydraulic pump 30 and the pistons 74 and 76 in the manner to be described hereinbelow. Drilled axial passage 102 intersects the radial drilled passage 104 for leading hydraulic fluid from the reservoir into the cavity 100 through the ball valve 106 that seats on the seat 108 formed on the end of passage 102. Radial passage 110 communicates with the axial passage 96 and the pocket 114 via the ball valve 116 that seats on the seat 119 formed on the end of passage 110.

Piston 90 defines with cylindrical bore or its cylinder a working chamber 118 and as the piston 90 travels rectilinearly the volume of the working chamber changes. When the piston is raised the volume of chamber 118 expands and creates a suction forcing the fluid from reservoir to flow through valve 106 via passages 102 and 104 to fill this volume. When the piston is lowered the fluid in working chamber 118 is pressurized forcing the fluid out of chamber 118 though ball valve 106 via the passage 114 into the cavity 100. This pressurized fluid is then directed to the working surfaces of both pistons 74 and 76 to cause them to translate and move outwardly to bear against the shafts 16 and 18 as will next be described.

As best seen in FIGS. 4 and 7, the drilled passage 120 formed from the outside of the housing 22 extends from the side wall 118 of housing 22 under the reservoir 40 up to and including the bore 70 and through the opening 101 formed adjacent to the sleeve 88. In operation, the piston 90 when displaced forces the hydraulic fluid expelled through ball valve 112 through opening 101 into the passage 120 to lead pressurized fluid into bore 70 to act on the working face 82 and cause the pistons to translate axially. It will be appreciated that the end of the pump piston includes a suitable gasket or lip seal 83 to assure that the fluid doesn't leak around the piston and migrate to the back side of the working surface.

It will be appreciated from the foregoing, that the main housing and platen design facilitates the manufacturing of the hydraulic tool. The platen is not only utilized as a cover plate for the main housing, it is utilized to set the hydraulic tool in the operational position to disassemble the blower. The hydraulic tool uses a minimum number of components. The drilling of the passage 120 is an external operation and communicates all of the cylinders of the pistons and pump located in the main housing and after the drilling of the passage 120 in a single operation. Obviously, the end of passage 120 is plugged by a suitable plug 121 to assure that the fluid doesn't leak out through this path.

Handle 28 which may have its end knurled for ease of handling is pivotally attached to the bracket 122 frictionally fitted into an axial slot formed in housing 22 and extends outwardly therefrom. The end of the handle 28 includes a slot 124 in which the bracket 122 is inserted and is pivotally connected thereto via a retaining pin 126 that serves as an axle. The end of piston 90 carries a shaft 130 that fits into the slot 132 formed in handle 28 and connected thereto by pin 134. Obviously, raising and lowering the handle 28 imparts rectilinear movement to the piston 90 for pumping the hydraulic fluid to force it into the working chambers of the pistons 74 and 76 to force the pistons outwardly and eventually forcing the shaft of the gears in the blower to separate therefrom. The hydraulic tool includes the breather line 140 with a breather cap 142 threaded into the platen 24 communicating with reservoir 40. This serves to allow any air migrating into the reservoir 40 escapes. A suitable breather cap 142 or air vent is commercially available from the Hercules Hydraulic, Inc. located in Tallahassee, Fla.

As best seen in FIG. 6, in order to allow the pistons to retract after the gears are removed the manually operated valve 150 is provided. The valve 150 includes a machine bolt 152 threaded into the bore 153 formed on the side of the main housing 22. The end of the machine bolt 152 bears against the ball valve 154 disposed at the remote end of the machine bolt and unscrewing the same causes the ball valve 154 to unseat. The diameter of bore 153 is enlarged at the top to accommodate the O-ring 162 fitted on the shank of the machine bolt 152 which normally prevents leakage when seated in the bore 153. Retracting the machine bolt 152 by turning the enlarged head 158 which may be knurled valve allows ball valve 154 to open and connect passage 120 with the reservoir 40. This serves to relieve the pressure in all the cylinders in the hydraulic tool. This is manifested by communicating passage 140 with the reservoir 40 via the drilled passage 156 which intersects passage 140 and drilled passage 160 which communicates with the reservoir 40 via the drilled passage 156, ball valve 154 and the space provided by the reduced diameter portion 166 of machine bolt 152. By retracting the machine bolt by turning the enlarged head 158, the ball unseats and vents the pressure in passage 140 and the reservoir. Since passage 140 communicates all of the cylinders, namely the pump cylinder and the two piston cylinders with the reservoir, the pressure in these compartments will be reduced to the value of the pressure in the reservoir which is ambient. The lower pressure allows the pistons to be retracted, which is manually accomplished by pushing them back into their respective cylinders.

It is apparent from the foregoing that when the hydraulic tool 10 is utilized for the disassembling operation the bottom thereof is rotated 90 degrees to be mounted on the casing of the blower. This places the handle at the top relative to the position of the blower such that the operator merely has to push down and pull up on the handle to operate the pump. Obviously, the length of the handle can be changed to a larger size in order to obtain a larger mechanical advantage if more force is required to remove the gears.

What has been described is a simple, relatively inexpensive hydraulic tool for disassembling a blower utilized on certain types of diesel engines, like the commercially available Detroit Diesel Engine. The hydraulic tool has a minimum of number of components and the platen serves to enclose the reservoir eliminating the need for a cover plate as well as aligning and orienting the hydraulic tool when placed in operation. All the passages and cylinders are externally formed so that the unit need not be cast and can be fabricated directly from blank stock.

Although this invention has been shown and described with respect to detailed embodiments thereof, it will be appreciated and understood by those skilled in the art that various changes in form and detail thereof may be made without departing from the spirit and scope of the claimed invention.

I claim:

1. An hydraulic tool for use on a blower of a diesel engine, said blower including mating gears and parallel shafts supporting said mating gears, said hydraulic tool for disassembling said mating gears on said blower, said hydraulic tool having a main housing, a pair of parallelly disposed cylinders and a hydraulic pump and reservoir for storing hydraulic fluid formed in said main housing, said main housing having a top, a bottom and opposing sides, defining said pair of cylinders and a fluid reservoir opened at said bottom, a platen attached to said main housing for closing said reservoir and including means for being attached to said blower and aligning said cylinders with said parallel shafts, a hydraulic pump disposed in said main housing, a hydraulic piston disposed in each of said pair of cylinders and translatable through complementary openings formed in said platen, a handle pivotally attached to the exterior of said main housing and to said pump for manually operating said pump to pressurize the fluid from said reservoir, fluid connecting means interconnecting said pump and said reservoir and said pair of cylinders for translating said pistons whereby said pistons force the parallel shafts simultaneously to be displaced for removing said gears therefrom.

2. An hydraulic tool as claimed in claim 1 wherein said piston is circular and has a predetermined diameter, said diameter of said piston in each of said pair of cylinders is less than the diameter of said shafts whereby said gears fit onto each of said pistons when the shafts are displaced.

3. An hydraulic tool as claimed in claim 2 including a breather valve operatively connected to said reservoir for allowing air to escape therefrom and preventing fluid from leaking out therefrom.

4. An hydraulic tool as claimed in claim 2 including a pressure relief valve operatively connected to said reservoir, said pair of cylinders and said pump for relieving the pressure in said cylinders whereby said piston are manually retracted.

5. An hydraulic tool as claimed in claim 1 wherein said pump includes a sleeve disposed in said main housing for defining another cylinder, another piston disposed in said another cylinder defining with said another piston a variable volume chamber, said variable volume chamber being varied by moving said handle in an up and down direction whereby fluid from said reservoir is pumped to a higher pressure and conducted to said pair of cylinders for positioning said pistons for removing said shafts from said gears.

6. An hydraulic tool as claimed in claim 5 including a lip seal mounted on said another piston.

7. An hydraulic tool as claimed in claim 6 wherein said pair of cylinders sandwiches said reservoir and said fluid connecting means is a drilled straight-through hole extending from the exterior of said main housing and interconnecting said pair of cylinders and said reservoir.

8. An hydraulic tool as claimed in claim 7 wherein said pump includes a first ball valve disposed between said variable volume chamber and said reservoir for leading fluid into said variable volume chamber when it is expanded, and a second ball valve disposed between said variable volume chamber and the passage interconnecting said pair of cylinders for leading pressurized fluid from said variable volume chamber to said pair of cylinders when said variable volume chamber is compressed.

9. An hydraulic tool as claimed in claim 8 wherein said another piston includes a connecting rod portion extending from the end thereof for engaging said handle, pin means for attaching said connecting rod to said handle.

10. An hydraulic tool as claimed in claim 9 including pivoting means for attaching one end of said handle to said main housing for pivotal movement of said handle whereby said handle causes said pump to pressurize the fluid in said variable volume chamber.

11. An hydraulic tool as claimed in claim 10 wherein said platen is a rectangularly shaped metallic member having planar upper and bottom surfaces and opposing side edges extending beyond said main casing and a plurality of machine bolts extending through holes in said platen for attaching said hydraulic tool to existing tapped holes in said blower.

12. An hydraulic tool as claimed in claim 11 including a sleeve mounted on each of said plurality of machine bolts dimensioned and configured to mount said hydraulic tool on said blower and align said hydraulic piston disposed in each of said pair of cylinders with said shafts.

13. An hydraulic tool as claimed in claim 12 wherein said machine bolt includes an enlarged diameter head portion and said head portion is knurled.

* * * * *